United States Patent
Wolfe

(10) Patent No.: US 6,807,020 B2
(45) Date of Patent: Oct. 19, 2004

(54) LENS OPTIMIZATION AND COLOR CORRECTION FOR IMAGE PROJECTION SYSTEMS

(75) Inventor: Charles Robert Wolfe, Palo Alto, CA (US)

(73) Assignee: Jenmar Visual Systems, Fremont, CA (US)

( * ) Notice: Subject to any disclaimer, the term of this patent is extended or adjusted under 35 U.S.C. 154(b) by 0 days.

(21) Appl. No.: 10/291,079

(22) Filed: Nov. 8, 2002

(65) Prior Publication Data

US 2004/0061945 A1 Apr. 1, 2004

Related U.S. Application Data

(63) Continuation-in-part of application No. 10/211,785, filed on Aug. 1, 2002.

(51) Int. Cl.[7] ............... G02B 3/08; G02B 21/60; G02B 27/10
(52) U.S. Cl. ............ 359/742; 359/457; 359/625
(58) Field of Search ............... 359/457, 625, 359/628, 741, 742

(56) References Cited

U.S. PATENT DOCUMENTS

| 4,502,755 | A | * | 3/1985 | Mori et al. ............... 359/456 |
| 4,725,134 | A | * | 2/1988 | Ogino ............... 353/74 |
| 4,824,227 | A | | 4/1989 | Goldenberg et al. |
| 5,206,761 | A | * | 4/1993 | Ogino ............... 359/457 |
| 5,289,311 | A | * | 2/1994 | McClelland et al. ....... 359/457 |
| 5,485,308 | A | * | 1/1996 | Hirata et al. ............... 359/457 |
| 5,513,037 | A | * | 4/1996 | Yoshida et al. ............ 359/457 |
| 5,563,738 | A | | 10/1996 | Vance |
| 5,751,478 | A | * | 5/1998 | Yoshimura et al. ......... 359/453 |
| 5,781,344 | A | | 7/1998 | Vance |
| 6,046,847 | A | | 4/2000 | Takahashi |
| 6,076,933 | A | | 6/2000 | DiLoreto et al. |
| 6,185,038 | B1 | * | 2/2001 | Yamaguchi et al. ....... 359/457 |
| 6,292,294 | B1 | * | 9/2001 | Takahashi et al. ......... 359/455 |
| 6,519,087 | B2 | | 2/2003 | Moshrefzadeh |

OTHER PUBLICATIONS

International Search Report dated Nov. 3, 2003, for International Application No. PCT/US03/19611, filed on Jun. 20, 2003.

International Search Report dated Feb. 25, 2004, for International Application No. PCT/US03/35634, filed on Nov. 3, 2003.

* cited by examiner

Primary Examiner—David N. Spector
(74) Attorney, Agent, or Firm—Fenwick & West LLP

(57) ABSTRACT

Method and apparatus for collimating light of projected images establishes limited few designs of Fresnel lenses to accommodate conventional image projection system having a wide range of sizes of viewing screens for the projected images. A multi-layer image-enhancing filter is disposed to receive substantially collimated image light exiting the Fresnel lens. A light-transmissive structure includes a substrate layer supporting a single layer of contiguously-arranged beads of light transmissive material disposed on an incident surface of the substrate layer. A Fresnel lens includes angularly-pitched segments on one surface and an array of a plurality of elongated lenses aligned in one direction on an opposite surface of the Fresnel lens for passing a projected light image therethough to the layer of beads on the substrate layer.

18 Claims, 14 Drawing Sheets

LENS OPTIMIZATION AND COLOR CORRECTION FOR IMAGE PROJECTION SYSTEMS

RELATED CASES

The subject matter of this application relates to the subject matter of U.S. Pat. Nos. 5,563,738, and 5,781,344 and 6,076,933, and to the subject matter of pending application Ser. No. 10/039,622, entitled "Light Transmission Filter Having Amisotropic Properties and Method of Fabrication," filed on Dec. 31, 2001 by D. Vance et al., which subjects matter are incorporated herein in the entirety, and this application is a continuation-in-part of pending application Ser. No. 10/211,785 entitled "Lens Optimization for Image Projection Systems", filed on Aug. 1, 2002 by C. R. Wolfe.

FIELD OF THE INVENTION

This invention relates to image projection systems and more specifically to light-collimating lenses and associated image-enhancing light filters for displaying projected images over large-area display screens, and to lens arrays for correcting color or hue of a projected image as a function of the angle to the viewing screen at which a viewer sees the projected image.

BACKGROUND OF THE INVENTION

Certain contemporary large-screen video displays commonly rely upon image projection onto the rear surface of a display screen. Several forms of rear-projection screens have emerged ranging from slightly translucent diffusers to more complex multi-layer optical filters that modify viewing angles, image contrast, and the like, attributable to particular layered structures of such filters. Image-enhancing filters of this type are described in the literature. (See, for example, U.S. Pat. No. 6,076,933 and 5,781,344.)

One common requirement of image-enhancing viewing screens in such applications is the need for substantially collimated light of the projected image incident upon the rear surface of the viewing screen. This may be accomplished approximately, but not commercially practically, in projection systems that project an image over a great distance. More commonly and practically, Fresnel lenses are introduced into an image projection system to optically reform the path of image light from a projected cone of diverging light rays into a substantially collimated pattern of parallel light rays incident upon the rear surface of the viewing screen. Of course, the path of projected image light may be optically folded and otherwise manipulated using reflectors and supplementary lenses within associated cabinetry in order to provide substantially collimated incident light images to the rear surface of a viewing screen.

Light-image projection systems have selected physical characteristics including a certain projection distance and a certain diagonal dimension from which an "f" number, or f/#, may be determined as the ratio of projection distance (from the projector to the viewing screen) to the diagonal dimension of the focused projected image. The practical necessity of shortened projection distances for convenient enclosure within modest-size cabinetry is exacerbated by popular demands for larger viewing screen that now result in f/#'s for projection systems which are commonly less than 1.

Additionally, a Fresnel lens has a maximum diagonal dimension of its active lens area, and has a selected focal distance from which an f/# for the lens can be similarly calculated as the ratio of the focal distance to the diagonal dimensions of the lens area. Ideally, the f/# of the projection system should substantially match the f/# of the Fresnel lens to assure that the projected image light emerges from the Fresnel lens as substantially collimated rays incident on the rear surface of the viewing screen. However, such matching of f/#'s over a range of diagonal screen sizes and projection lengths within acceptable cabinet sizes commonly requires numerous Fresnel lenses of different sizes and designs for requisite matching of the applicable f/#'s. And, since tooling for forming Fresnel lenses is complex and expensive, it is desirable to minimize the required variations in sizes and lens designs commonly needed to match wide ranges of projection systems.

Such projection systems commonly includes 3 cathode-ray tubes (CRT), as shown in FIG. 9 (TV set with back and mirror removed). Each projection tube 39, 41, 43 is approximately 7" diameter and handles one of the primary colors (red, green and blue). These CRT's are typically arranged side-by-side across the back of a television cabinet 45 and produce a composite projected image viewable from the front side of a rear-projection screen 47. Various designs of image-enhancing filters are typically interposed between the projection CRT's 39, 41, 43 and the display screen on which the projected image is viewed in order to correct for color variations in the projected image as viewed from one and other sides of the display screen.

SUMMARY OF THE INVENTION

In accordance with the present invention, mismatching of projection and lens f/#'s within tolerable limits are resolved with negligible visible degradation of the projected image viewed through an image-enhancing filter. Specifically, a multi-layered image-enhancing filter including layers of transmissive beads and masking and index-matching materials, for example, as described in the aforementioned patents, can tolerate significant amounts of off-axis image (i.e., non-collimated) light with only negligible reduction in image quality. Accordingly, tolerable mismatching of projection distance and focal length of the Fresnel lens is utilized in combining a few Fresnel lens designs with a wide range of projection systems. In addition, the overall range of viewing screen sizes up to approximately 5 feet diagonally is divided into sub-ranges that require Fresnel lenses which are each designed around parameters at the mid-range of each such sub-range. This reduces the number of different lens designs required to substantially match the f/#'s of Fresnel lenses with the f/#'s of the projection systems required to produce images variously of about 40" to 70" diagonal dimensions on viewing screens in conventional height-width aspect ratios of 3:4 and 9:16.

Color shift may be discernable as a function of viewing angle (usually viewed relative to the surface normal of the display or viewing screen). Such color-shift can be detected and quantified using a spectrophotometer 49 positioned, as illustrated in FIG. 10, at various angles in a common horizontal plane relative to a normal 51 to the viewing screen 47. In this way, brightness of each of the colors red, green and blue in the viewable projected image can be measured to determine variations in the relative brightnesses or luminance of each color as a function of the viewing angle Correction of color variations as a function of viewing angle is achieved using an array of cylindrical lenses disposed in the path of incident light of a projected image before the light reaches the viewing screen or image-enhancing filter.

DETAILED DESCRIPTION OF THE INVENTION

Figure 1:
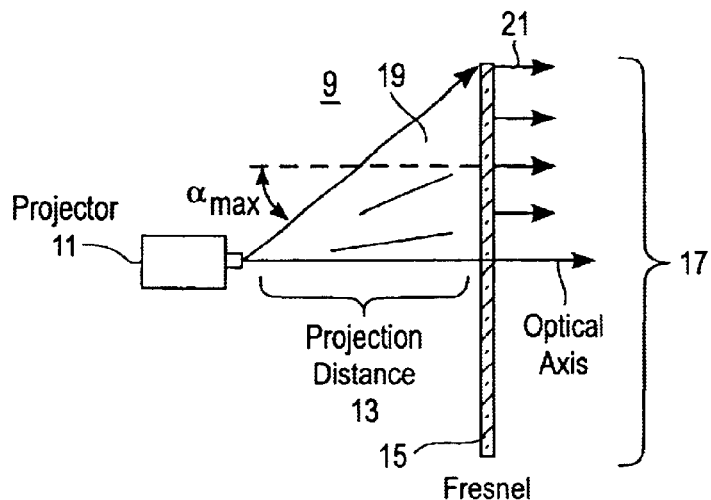
FIG. 1 is a pictorial illustration of a light-image projection system.

Referring now to FIG. 1, there is shown a pictorial illustration of a projection system 9 including a projector 11 that projects an image over a projection distance 13 on to a Fresnel lens 15 to produce a light image on the rear or incident surface of the lens 15 with a diagonal dimension 17. α is the angle that incident light makes with the surface normal. It varies continuously across the surface of the lens 15 from a minimum of zero degrees on the optical axis and increasing with distance from the optical axis of the lens 15, up to a maximum angle of, for example, about 55° at the outer limit of the projected image. The f/# of the projection system is determined by the ratio of projection distance 13 to diagonal dimension 17 (or diameter of the circular projected image), and the maximum α angle is determined by:

$$\alpha\ max = \text{arc tan (screen diagonal/2 projection distance)} \quad \text{(Eq. 1)}.$$

Figure 2:
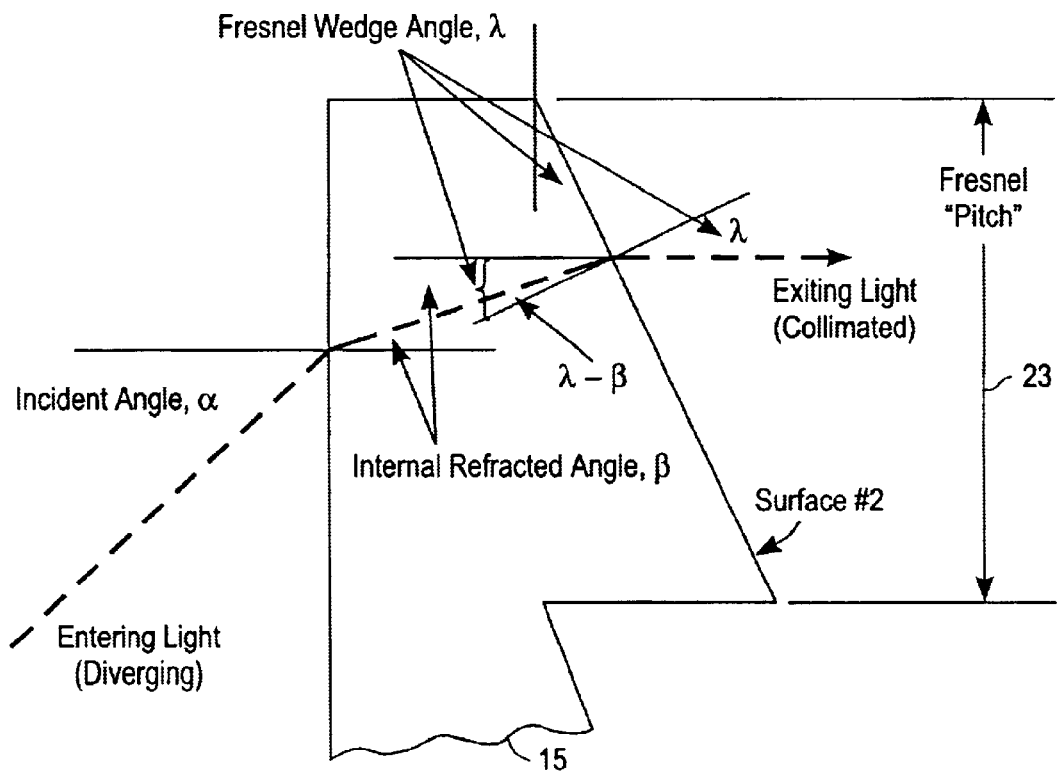
FIG. 2 is a pictorial illustration of a section of a Fresnel lens showing a refracted ray trace of the incident and exiting light beams.
Figure 3:
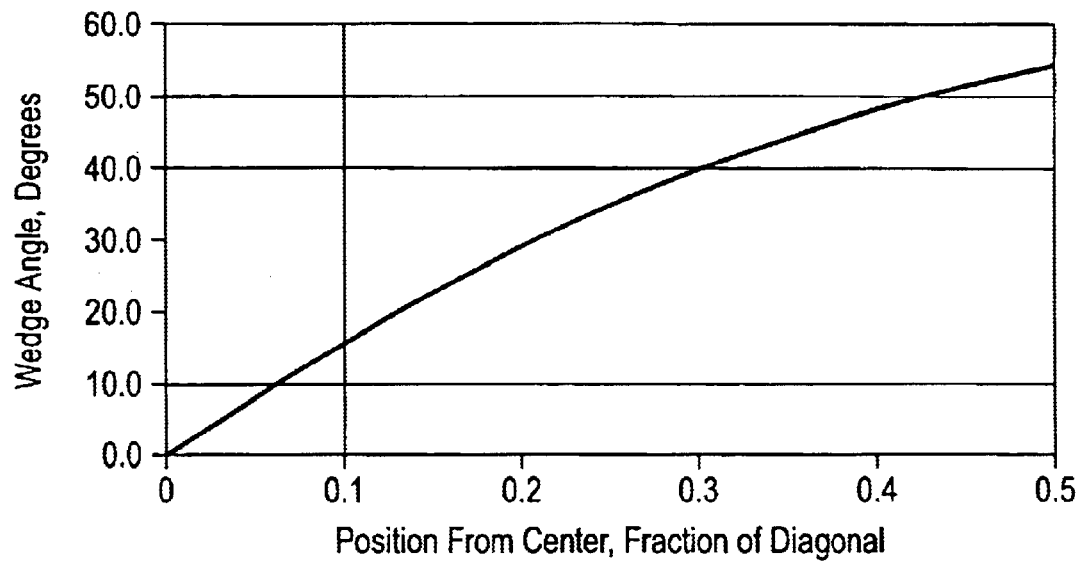
FIG. 3 is a graph illustrating variations of wedge-angle as a function of distance from the optical axis of a Fresnel lens.

To correct the incident projected image within the cone angle 19 to collimated light 21 at the outlet side of the Fresnel lens 15, the incident light entering the lens of angle α is internally refracted within the structure of the lens, as illustrated in FIG. 2, to exit as substantially collimated light per sector, or pitch 23 of the lens 15. In conventional manner for a Fresnel lens, the wedge angle, δ, per pitch varies with distance from the optical axis of the lens and is determined in accordance with Snell's law:

at the incident surface:

$$\sin \alpha = n \sin \beta \quad \text{(Eq. 2)}$$

at the exit surface.

$$n \sin \beta(\delta - \beta) = \sin \delta \quad \text{(Eq. 3)}$$

$$\sin \delta \cos \beta - \cos \delta \sin \beta = (\sin \delta/n) \quad \text{(Eq. 4)}$$

$$\cos \beta(\sin \delta)/(\cos \delta) - \sin \beta = (\sin \delta)/(n \cos \delta) \quad \text{(Eq. 5)}$$

$$(\tan \delta)(\cos \beta - 1/n) = \sin \beta \quad \text{(Eq. 6)}$$

$$\tan \delta = \sin \beta/(\cos \beta - 1/n) \quad \text{(Eq. 7)}$$

Figure 4:
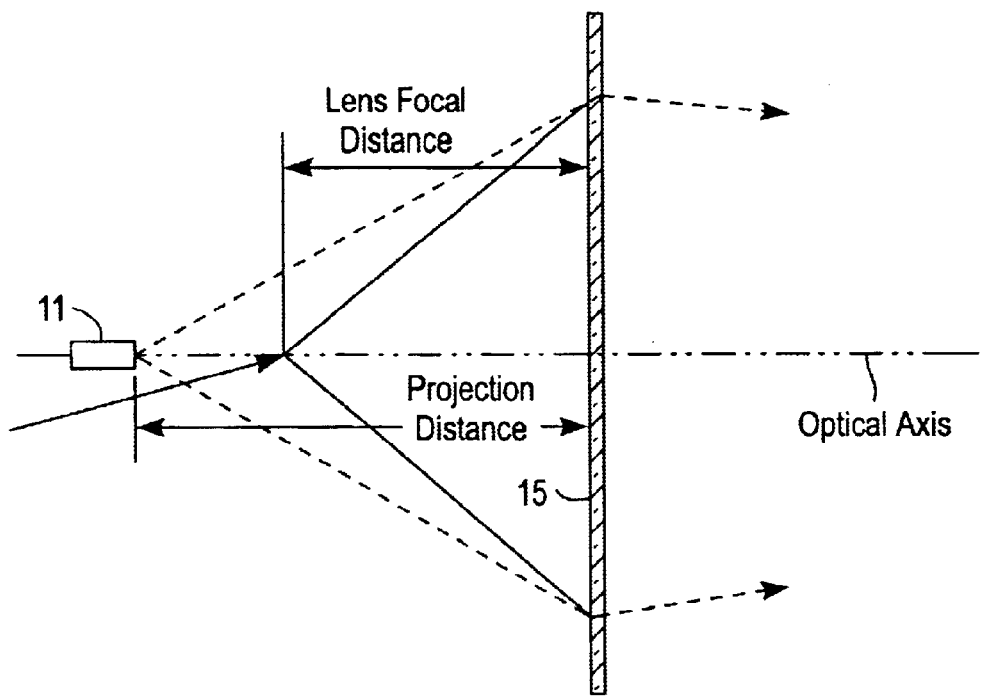
FIG. 4 is a pictorial illustration of image projection in a system having a lens focal distance shorter than the projection distance.

The maximum incident angle α of projected light occurs at the maximum distance from the optical axis of the lens 15, as illustrated in FIG. 1. For a square or rectangular lens 15, this maximum incident angle occurs at peripheral corners of the lens 15. For a conventional projection system that typically is designed to be f/0.80, the Fresnel lens may have an f/# smaller than the projection system f/# (e.g., f/0.73), and result in a configuration, as illustrated in FIG. 4, in which the projection distance is greater than the focal distance of the lens. In this configuration, the maximum incident angle α of the projected image can be shown to be about 32.0° and the maximum wedge angle α can be shown to be about 52.6° for a maximum internal refraction angle β of about 20.8°.

Similarly, for a typical Fresnel lens in this configuration that is designed to be f/0.73, the maximum incident angle can be shown to be 34.4°, and the maximum wedge angle α is 55.2° for a maximum internal refraction angle β of about 22.3°. Thus, in this configuration, the wedge angle required by the projection system is less than the wedge angle of the lens which results in convergent transmission of the exit light at an angle related to the difference of these wedge angles. In this configuration the Fresnel lens is said to "over-correct" the projector light.

Figure 5:
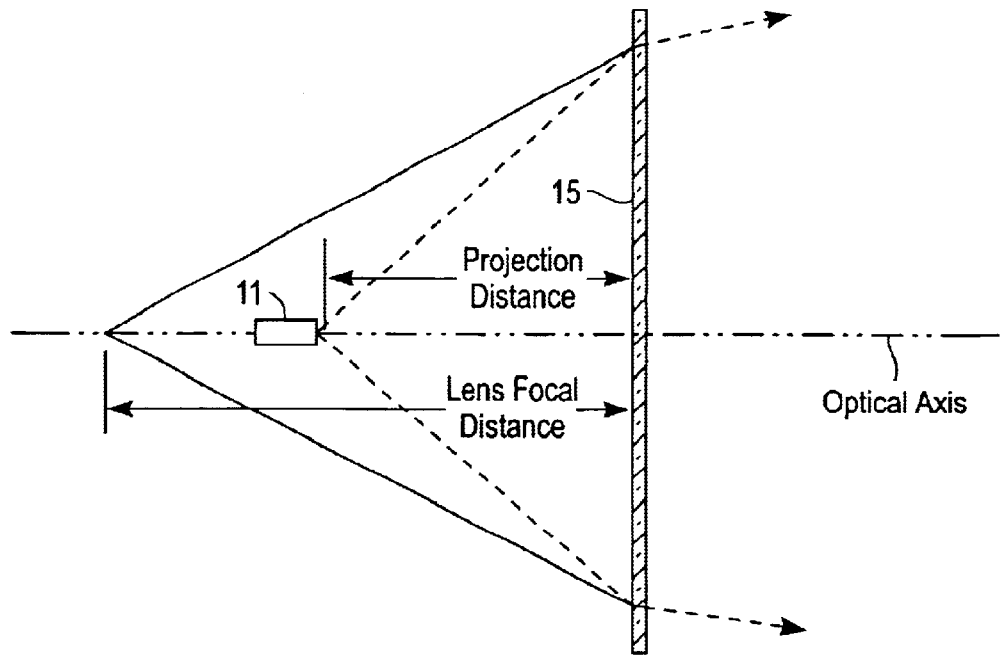
FIG. 5 is a pictorial illustration of image projection in a system having a lens focal distance longer than the projection distance.

Referring now to the conventional projection system of FIG. 5 in which the Fresnel lens is designed to be f/0.87. In this configuration, the focal length of the lens is greater than the projection distance, and maximum incident angle α of the lens is 29.9° and its maximum wedge angle α is 50.2° for maximum internal refraction angle β of 19.5°. Thus, in this configuration the wedge angle α required by the projection system is greater than the wedge angle of the lens which results in divergent transmission of the exit light at an angle related to the difference of these wedge angles. In this configuration the Fresnel lens is said to "under correct" the projector light.

For a given projection system of f/0.80, Fresnel lenses having a range of f/#'s approximating f/0.80 may be used to substantially collimate the exit light of the projected image. For a given lens focal length, the sizes of such lenses may be selected in accordance with the present invention to accommodate the variations in the screen sizes of the associated projection system.

Specifically, for projection distances (ranging from about 39" to 56") and screen sizes (ranging from about 40" to 70") associated with conventional projection video display systems designed to be f/0.80, then the appropriate lens f/# can be calculated, as set out in Table 1.

TABLE 1 f/# variation of the optimum f/0.73 lenses when cut to smaller screen sizes

| Screen diagonal, inches | Screen diagonal, mm | Projection distance, inches | Projection distance, mm | Lens f/# |
|---|---|---|---|---|
| 70 | 1778.0 | 56 | 1300.5 | 0.73 |
| 69 | 1752.6 | 56 | 1300.5 | 0.74 |
| 68 | 1727.2 | 56 | 1300.5 | 0.75 |
| 67 | 1701.8 | 56 | 1300.5 | 0.76 |
| 66 | 1676.4 | 56 | 1300.5 | 0.78 |
| 65 | 1651.0 | 56 | 1300.5 | 0.79 |
| 64 | 1625.6 | 56 | 1300.5 | 0.80 |
| 63 | 1600.2 | 56 | 1300.5 | 0.81 |
| 62 | 1574.8 | 56 | 1300.5 | 0.83 |
| 61 | 1549.4 | 56 | 1300.5 | 0.84 |
| 60 | 1524.0 | 56 | 1300.5 | 0.85 |
| 59 | 1498.6 | 56 | 1300.5 | 0.87 |
| 58 | 1473.2 | 46.4 | 1077.0 | 0.73 |
| 57 | 1447.8 | 46.4 | 1077.0 | 0.74 |
| 56 | 1422.4 | 46.4 | 1077.0 | 0.76 |
| 55 | 1397.0 | 46.4 | 1077.0 | 0.77 |
| 54 | 1371.6 | 46.4 | 1077.0 | 0.79 |
| 53 | 1346.2 | 46.4 | 1077.0 | 0.80 |
| 52 | 1320.8 | 46.4 | 1077.0 | 0.82 |
| 51 | 1295.4 | 46.4 | 1077.0 | 0.83 |
| 50 | 1270.0 | 46.4 | 1077.0 | 0.85 |
| 49 | 1244.6 | 46.4 | 1077.0 | 0.87 |
| 48 | 1219.2 | 39.2 | 894.1 | 0.73 |
| 47 | 1193.8 | 39.2 | 894.1 | 0.75 |
| 46 | 1168.4 | 39.2 | 894.1 | 0.77 |
| 45 | 1143.0 | 39.2 | 894.1 | 0.78 |
| 44 | 1117.6 | 39.2 | 894.1 | 0.80 |
| 43 | 1092.2 | 39.2 | 894.1 | 0.82 |
| 42 | 1066.8 | 39.2 | 894.1 | 0.84 |
| 41 | 1041.4 | 39.2 | 894.1 | 0.86 |
| 40 | 1016.0 | 39.2 | 894.1 | 0.88 |

From Table 1, it should be noted that a range of lens f/#'s calculated in this manner center around a match with the projection system of f/0.80 for projection distance of 56" and screen diagonal dimensions ranging from about 59" to 70". Similarly, it should be noted that the same range of lens f/#'s can be calculated in this manner centered around a match with the projection systems of f/080 for smaller projection distances of about 46.4" and screen diagonal dimensions ranging from about 49" to 58". Additionally, substantially the same range of lens f/#'s can be calculated in this manner centered around a match with the projection systems of f/0.80 for smaller projection distances of 39.2" and screen diagonal dimensions ranging from 40" to 48". For Fresnel lenses with f/#'s not matching the f/# of the projection system, the projected image light exiting the lens will not be collimated but instead will diverge or converge, as illustrated in FIGS. 4 and 5. It has been determined that multi-layer image enhancing filters, for example, of the type described in the aforementioned patents, function suitably well with off-axis image (i.e., non-collimated) light from mis-matched projection system f/#'s and lens f/#'s by up to about ±25% without significant degradation of the viewable image. Thus, such image-enhancing light filters 27 may be disposed to receive the projected image light exiting from Fresnel lenses that are designed to f/#0.73 in only three size ranges for substantial match with projection systems of f/0.80 in typical 3 sizes of projection distances from 39.2" to 56", as grouped for illustration in Table 1. Thus, one Fresnel lens of f/0.73 and 70" diagonal size can provide adequately collimated light in projection systems of f/0.80 projection distance of 56" for a range of lens sizes from 70" through smaller lenses cut therefrom down to 59", with only ±0.07 mismatch in f-numbers, or not more than 10% variation over this range of lens sizes. Similarly, another Fresnel lens of f/0.73 and 58" diagonal screen size can provide adequately collimated light in projection systems of f/0.80 and projection distance of 46.4" for a range of lens sizes from 58" through smaller lenses cut therefrom down to 49", with only ±0.07 mismatch in f-numbers, or not more than 10% variation over this range of lens sizes. Additionally, one more Fresnel lens of f/0.73 and 48" diagonal screen size can provide adequately collimated light in projection systems of f/0.80 and projection distance of 39.2" for a range of lens sizes from 48" through smaller lenses cut therefrom down to 40", with only ±0.08 mismatch in f-numbers, or not more than ±10% variation over this range of lens sizes. Each of these three Fresnel lenses can also accommodate screen sizes within the associated grouping of screen sizes, in 3:4 and 9:16 aspect ratios of the maximum height and width dimensions, as shown in Table 2. The Fresnel lens 15 is commonly formed as a substantially flat sheet of a material such as polycarbonate or polymethyl methacrylate, with a substantially circular pattern of the concentric pitch segments 23 formed at least in the exit surface. Such material can be cut conveniently from a sheet containing the largest size of Fresnel lens per size group into the population of smaller lenses per such size group, as set forth in Tables 1 and 2.

TABLE 2

Maximum height and width for 3:4 lenses and the maximum height and width possible from them in 9:16 aspect ratio

| 3:4 aspect ratio | | | 9:16 aspect ratio | | |
|---|---|---|---|---|---|
| Diagonal, inches | Height | Width | Diagonal, inches | Height | Width |
| 70.0 | 42.0 | 56.0 | 64.3 | 31.5 | 56.0 |
| 58.0 | 34.8 | 46.4 | 53.2 | 26.1 | 46.4 |
| 48.0 | 28.0 | 38.4 | 44.1 | 21.6 | 38.4 |

Figure 6:
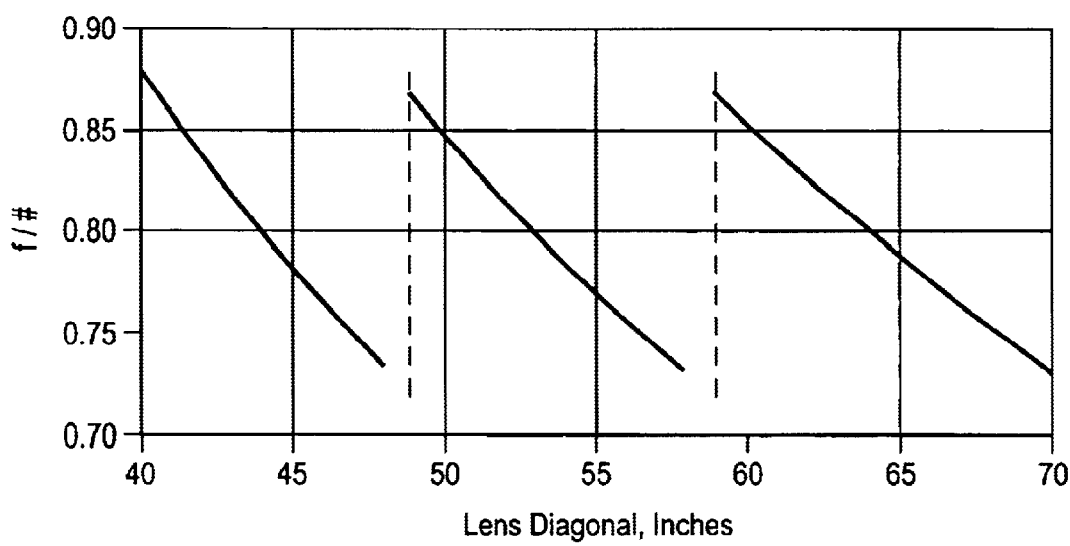
FIGS. 6–7 are graphs illustrating f/# variations of lenses required in image projection systems to provide collimated exit illumination over a range of screen sizes.

The three such designs of Fresnel lenses accommodate a range of screen sizes in projection systems of f/0.80, as graphically illustrated in FIG. 6.

Figure 7:
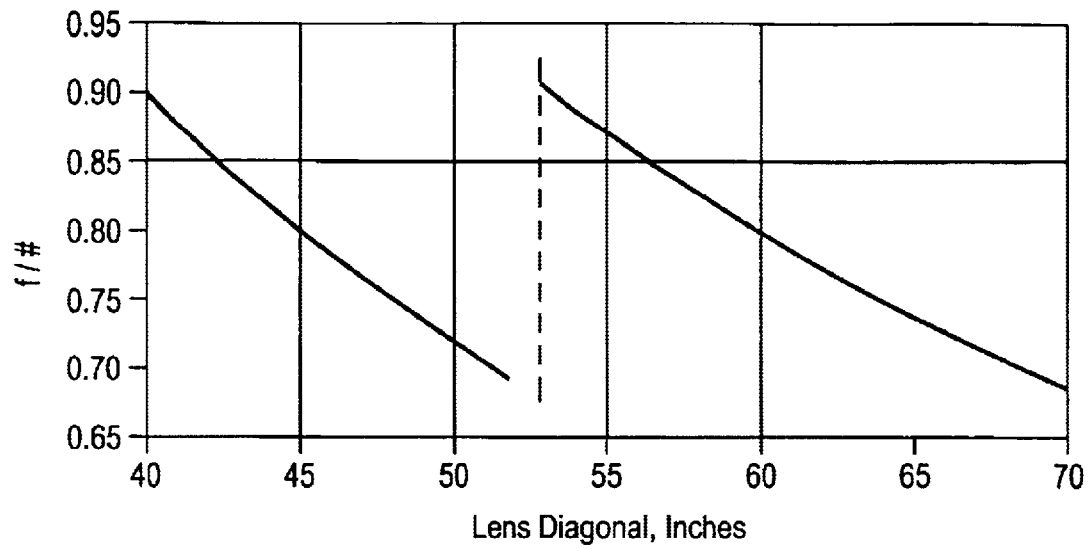

In another embodiment of the present invention, as illustrated in the graph of FIG. 7, the entire range of screen diagonal dimensions from 40" to 70" in projection systems of f/0.80 can be accommodated with two Fresnel lenses, designed as described above. Specifically, one lens of f/0.69 and diagonal dimension of 70" can accommodate smaller lens sizes cut therefrom down to 53" with only about ±0.11 variation in mismatch of f/#'s over the range of lens sizes. Additionally, another Fresnel lens of f/0.69 and diagonal dimension of 52" can accommodate smaller lens sizes cut therefrom down to 40" with only about ±0.11 mismatch of f/#'s, or not more than about ±14% variation over this range of lens sizes.

Figure 8:
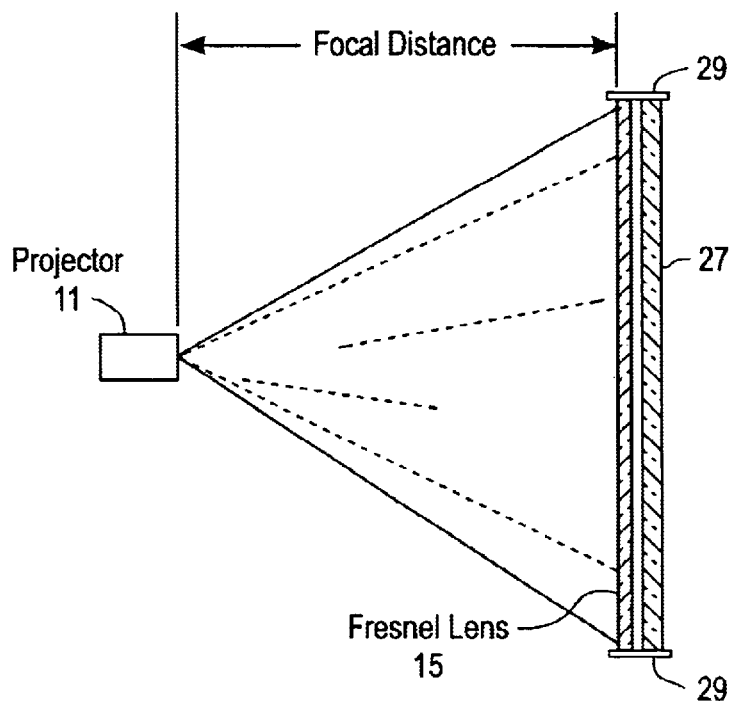
FIG. 8 is a pictorial illustration of an image projection system and associated lens and image-enhancing filter assembled according to the present invention.

In each of the embodiments of the present invention, a multi-layer, image-enhancing light filter 27, for example, of the type described in the aforementioned patents, is disposed in spaced relationship to the Fresnel lens 15 to receive the exit light of a projected image transmitted through the Fresnel lens 15. As illustrated in FIG. 8, the Fresnel lens 15 and the light filter 27 are typically mounted together 29 with very small air space therebetween.

Figure 9:
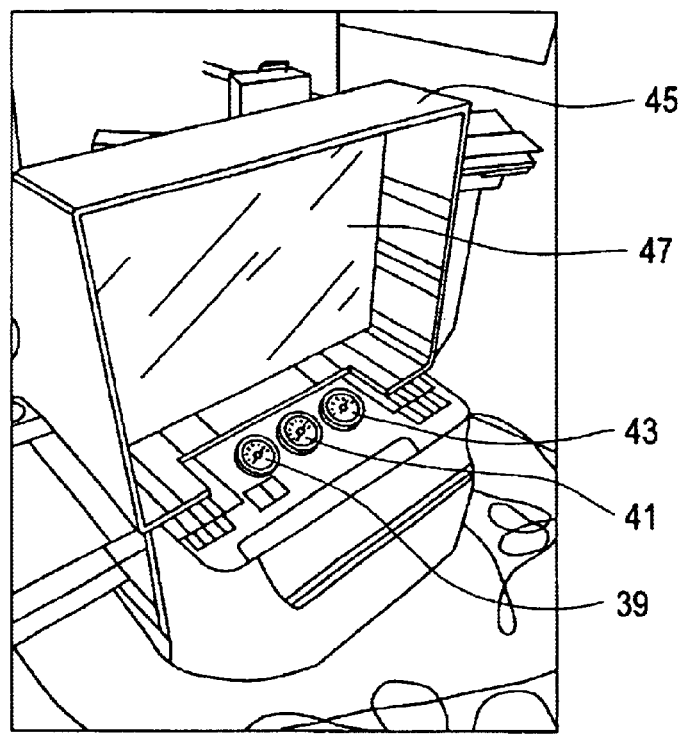
FIG. 9 is a photograph of a standard projection television set from the rear, showing the 3 CRT projection tubes.
Figure 11:
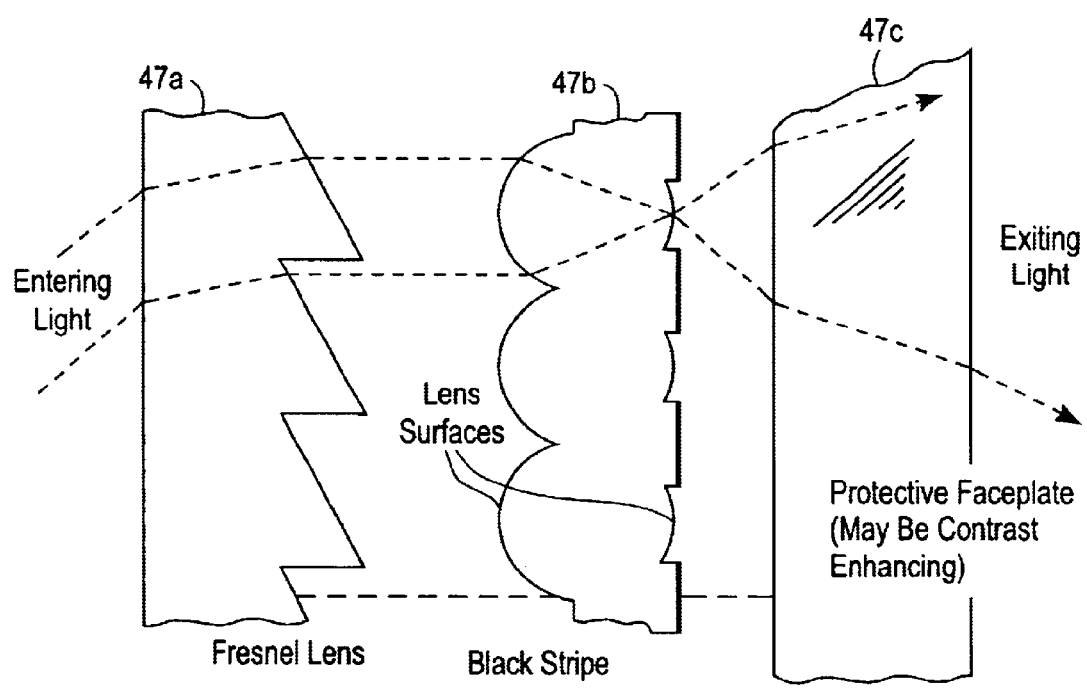
FIG. 11 is a partial top sectional view of a conventional rear-projection viewing screen including Fresnel lens and bi-convex cylindrical lens array and image-enhancing element and face plate.
Figure 12:
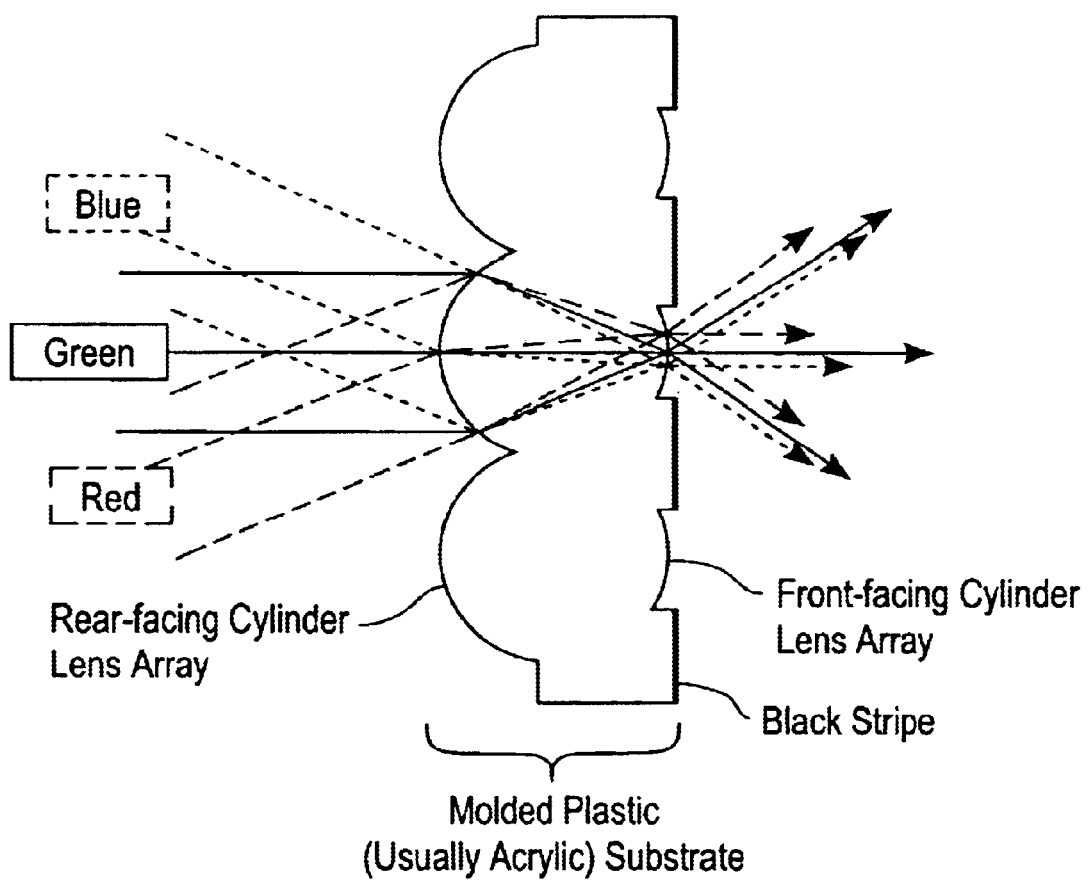
FIG. 12 is a pictorial partial top view of the operation of the bi-convex cylindrical lens array of FIG. 11 to reduce color shift.

Referring now to FIG. 11, there is shown a pictorial top view of a portion of a 3 piece standard projection screen 47 that is disposed in the path of a projected light image from the projection system, as shown in FIG. 9, which contains 3 CRT's that are spaced along a common axis lateral to their projection axes. Such projected light image in 3 colors (i.e., red, green, blue) conventionally passes through a Fresnel lens 47a, as shown in FIG. 11, that substantially collimates the light rays forming the image as incident upon a rear projection screen of conventional configuration. Such conventional rear-projection screens commonly include an array of bi-convex lens elements and an array of thin opaque lines (that enhance contrast) vertically oriented on the viewing side of the screen 47b with a spatial pitch of greater than 25–50 vertical lines/inch. In addition, there is usually a face plate 47c that Is positioned to protect the fine-ruled structure of the screen 47b and that may provide some additional contrast-enhancing characteristics or light-diffusing properties in conventional manner. The function or operation of the conventional screen 47b is graphically illustrated in FIG. 12 which illustrates refraction of the three colors of light forming the projected image along substantially parallel exit paths as an indication of diminished color shift.

Figure 13:
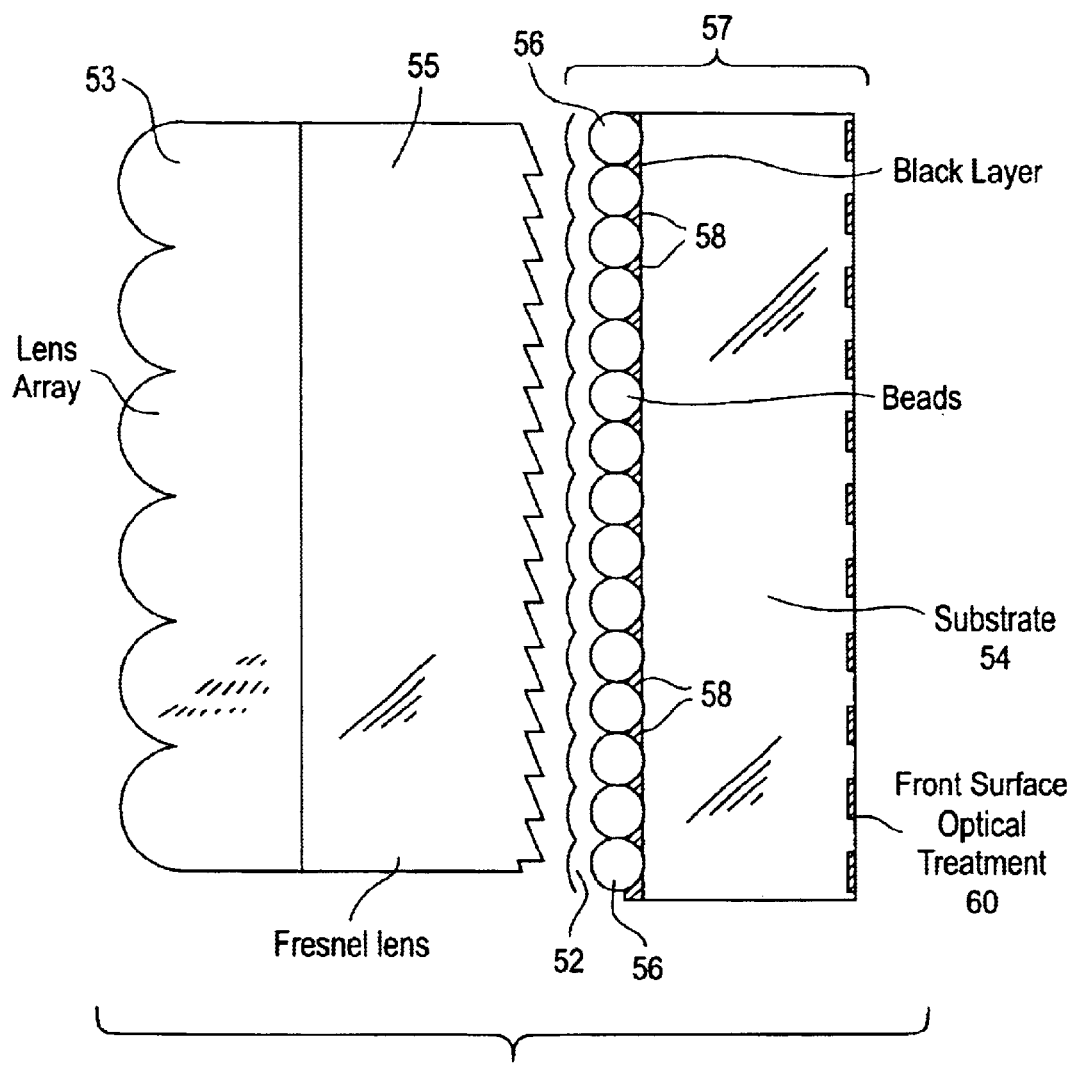
FIG. 13 is a partial top sectional view of one embodiment of the present invention including a single convex cylindrical lens array, Fresnel lens and beaded screen forming an image-enhancing filter.
Figure 17A:
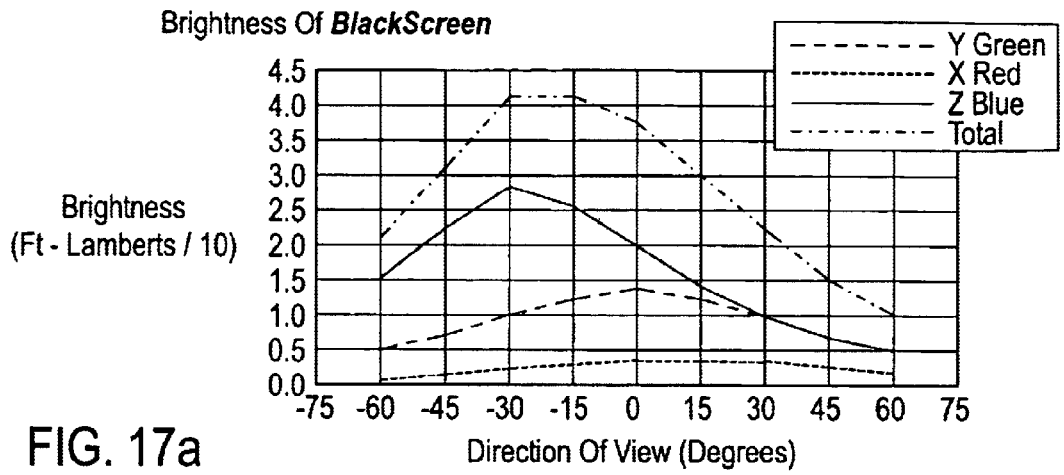
FIGS. 17 a, b, c are graphs of, respectively, color brightness the normalized brightness and color shift of a viewing screen of the present invention without the color correction applied.
Figure 17B:
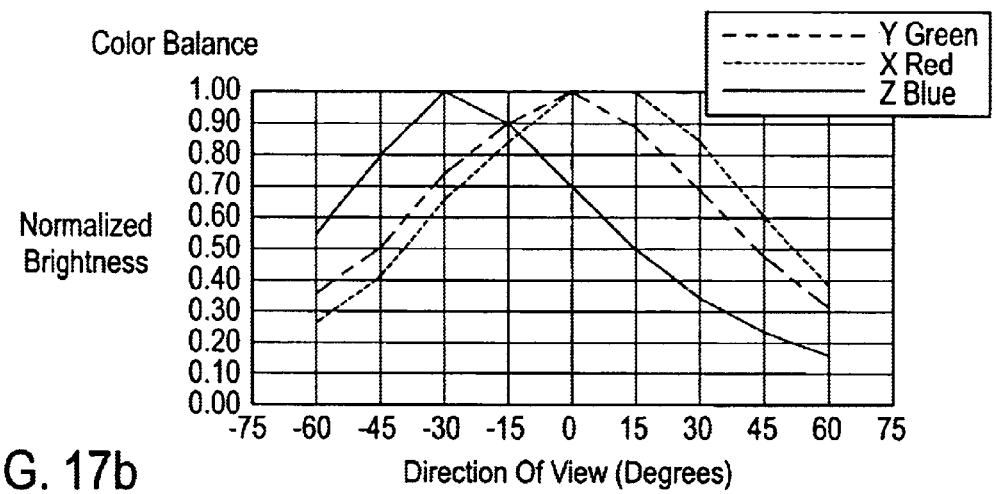

Alternatively, the embodiment of the present invention illustrated in FIG. 13 includes a succession of optical components including a single convex lens array 53, a Fresnel lens 55 and an image-enhancing filter including a beaded screen 57 interposed between the light-image sources and the viewer. The image-enhancing filter 57 may be configured as described, for example, in U.S. Pat. No. 5,563,738. Image-enhancing filters of these types include a single layer of tiny transparent beads 56 of about 70 $\mu$m diameter disposed in contiguous array within a single layer over the area of the viewing screen, and include optical barriers 58 of substantially opaque material to establish limited apertures at the base of each bead contacting the transparent substrate 54 to promote more uniform viewing of a projected image as a function of horizontal or vertical viewing angles relative to an axis normal to the viewing area. However, the 3 cathode-ray tubes that produce the different colors of a projected image are linearly arranged across the focal spot of the Fresnel lens 55 and this spaced arrangement of the CRT's contributes to color shifts or change in image hue in the projected image when it is viewed at various angles relative to an axis normal to the viewing screen 57. A composite structure including only the image-enhancing filter 57 and Fresnel lens 55, with the pitched-surface segments of the Fresnel lens 55 disposed at spacings of about 120–140$\mu$, operates on a projected image to yield less substantial color correction as shown, for example, by the data in FIGS. 17a, b, c.

Figure 14A:
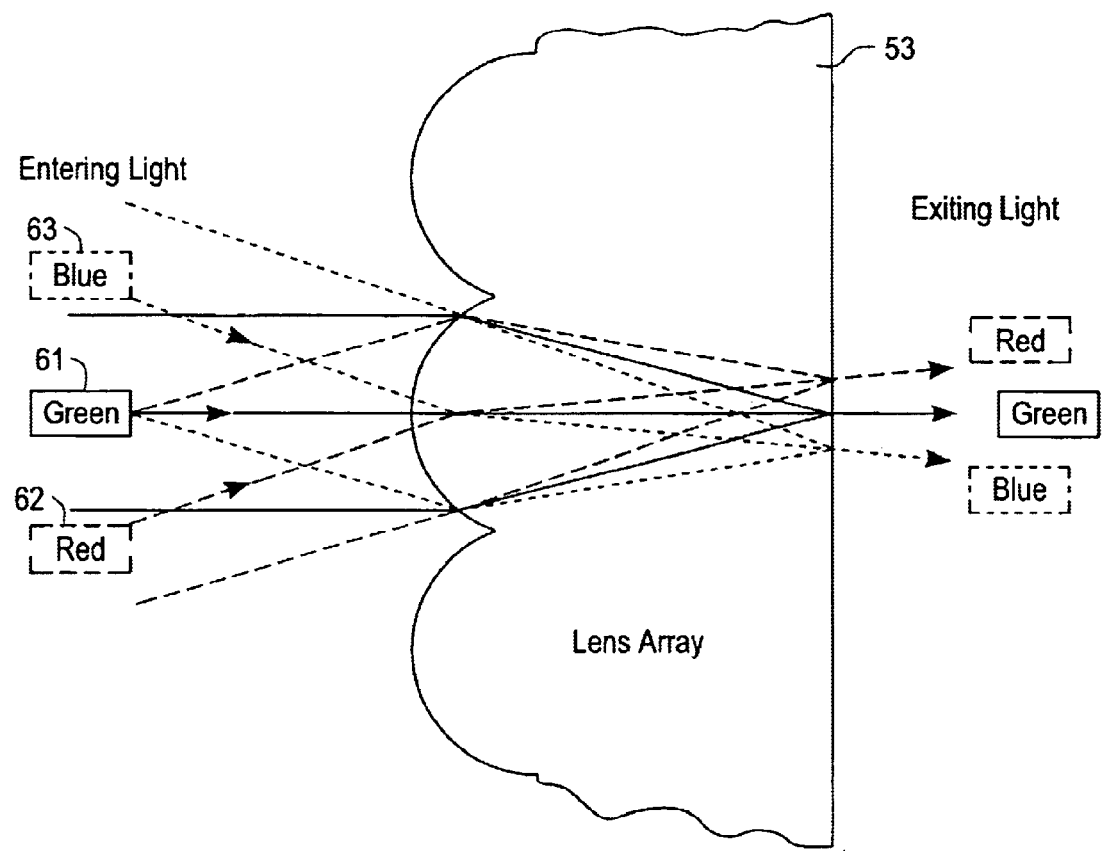
FIG. 14a illustrates the function of a single convex lens array to reduce color divergence.

In accordance with the illustrated embodiment of the invention shown in FIG. 13, the single convex cylindrical lenses 53 are oriented in the vertical direction in contiguous array at a spacing pitch of about 60–90 lenses per inch, and are disposed in the projection path ahead of the Fresnel lens 55 and the image-enhancing filter 57. The cylindrical single convex surfaces of the lens array 53 are oriented toward the image light sources in this embodiment to promote refraction of the light image to produce divergence of light rays of the three-color images that are incident at different angles upon a given segment of the lens array 55. In this embodiment, as shown in greater detail in the partial view of FIG. 14a, CRT 61 that projects green-light images is centrally disposed and is oriented to project toward the center of the Fresnel lens. Ray traces of green light are shown in FIG. 14a as incident upon the cylindrical lens array 53 in normal, parallel orientation. Ray traces of light from a laterally-displaced CRTs (e.g., projecting red light 62 or blue light 63) are incident at non-normal incidence. As illustrated, the angular orientation of incident light of the different colors is refracted by the lens array 53 to produce exiting light of the same colors at significantly diminished angular divergence.

Figure 14B:
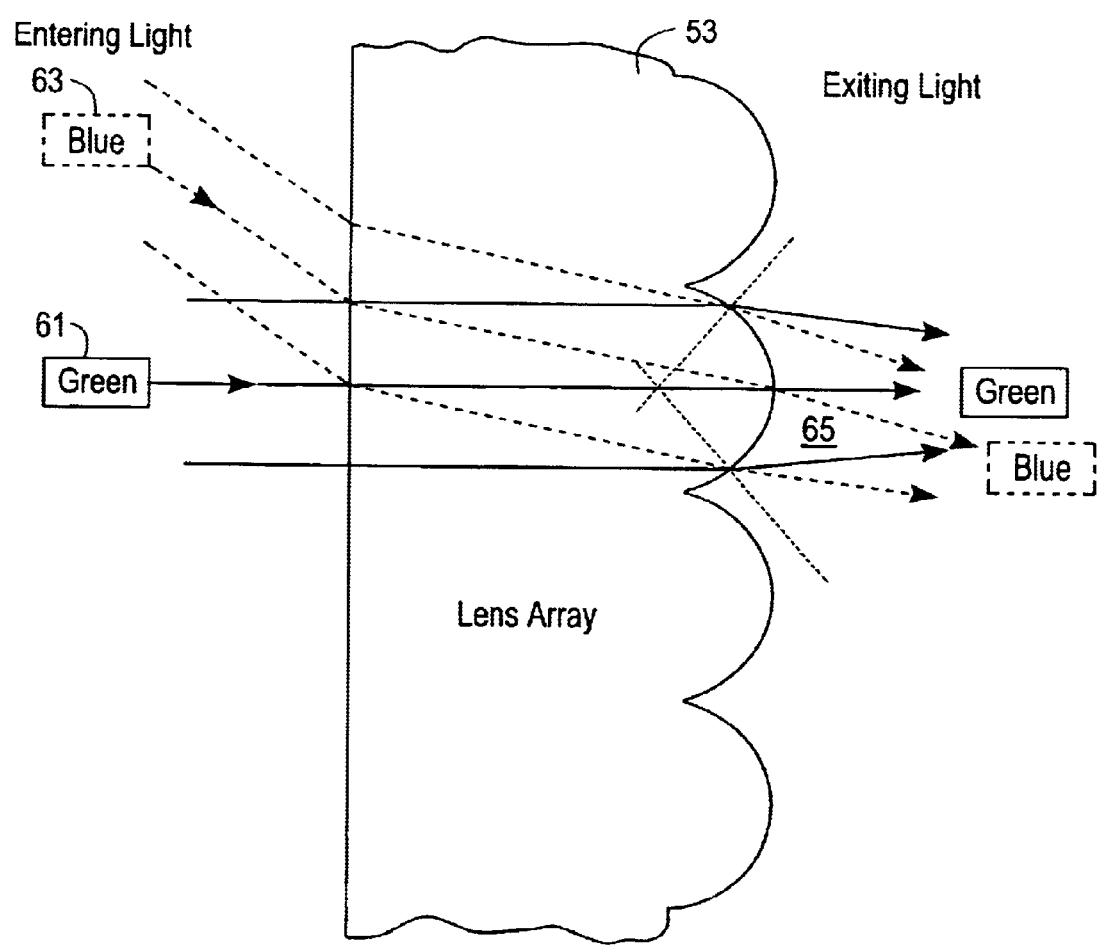
FIG. 14b partially illustrates another embodiment of the single convex lens array to achieve color correction.

Alternatively, as illustrated in the partial view of FIG. 14b, incident light in the three primary colors 61–63 of the projected image are shown as incident upon the rear of cylindrical surfaces of the lens array 53. In this embodiment, the refracted ray traces of the on-axis color (i.e., green) and of an off-axis color (e.g., red or blue) are shown transiting the lens array 53 to exit at substantially diminished angular divergence relative to the angular deviations of the colors of incident light. In each of these embodiments, the lens array 53 may be extruded or embossed along the direction of the elongated lens configuration on a substrate layer of clear plastic sheet material of about 0.010" to about 0.030" thickness. Similarly, the Fresnel lens 55 may be embossed into a substrate sheet of clear plastic material of, for example, methyl methacrylate of about 0.030"–0.120" thickness using at least one of heat and pressure, in conventional manner. Alternatively, both the lens array 53 and Fresnel lens 55 may be simultaneously embossed into opposite surfaces of a common substrate layer of clear plastic material using conventional techniques of applied heat and pressure to form the integrated lenses 53, 55. The elongated lenses 53 may be formed with other cross sectional shapes such as ellipsoidal, paraboloidal or other monotonic curve, or prismatic cross section such as trapezoidal or triangular.

In one embodiment of the present invention, a substantially conformal layer 52 of transparent material is disposed over the exposed incident side of the beads 56, to a thickness of about 0.5 to about 1.5 times the radius of the underlying beads. Such materials having greater index of refraction than air in the adjacent region between the Fresnel lens 55 and having an index of refraction less than the material of the beads 56, promotes refraction of light into the beads 56 from a larger surface area exposed to incident light flux than the surface of the beads alone. Also, the surface contour of the conformal layer 52 may be substantially spherical, ellipsoidal, paraboloidal or faceted or prismatic to 'capture' and refract additional incident light flux into the contiguous beads. Arrays of beads in this configuration are illustrated and described, for example, in U.S. Pat. No. 6,076,933. Also, the indices of refraction of the individual bead 56 in the array may vary relative to the index of refraction of the conformal layer 52 in order to control the gain of the filter 57. Thus, the index of refraction of the material selected to form the conformal layer 52 may vary from about 1.4 to about 1.9, and the material selected for the beads 56 may vary from about 1.4 to about 2.2, and beads of different indices of refraction may be randomly distributed throughout the array to alter the average gain of the filter 57, as perceived by a viewer from a location that is distant from the front surface 60.

Figure 10:
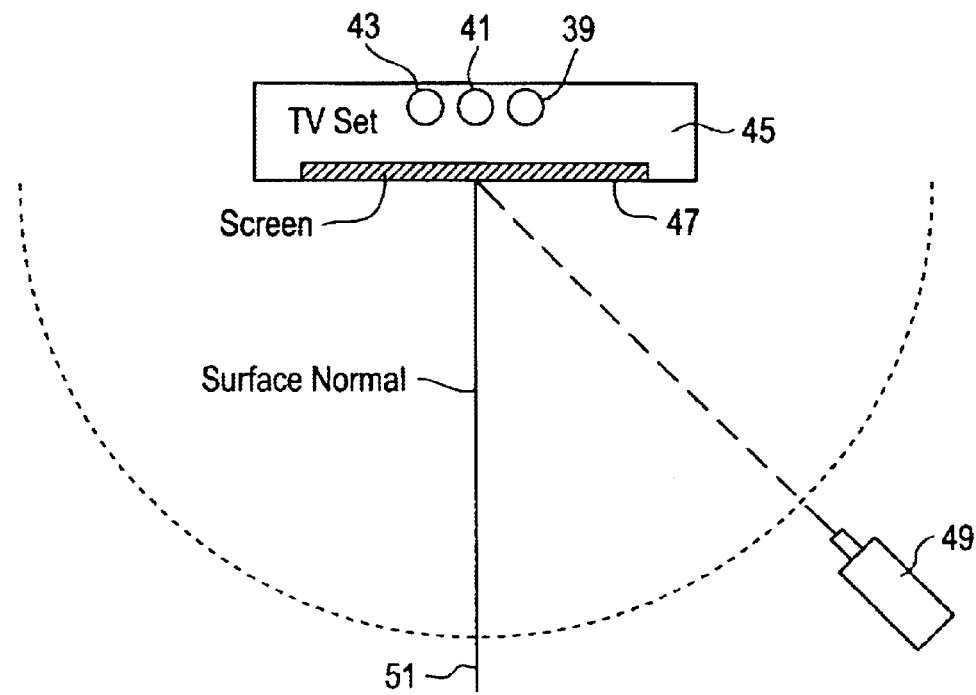
FIG. 10 is a pictorial illustration of measurement apparatus for detecting color shift in the television set of FIG. 9.
Figure 15A:
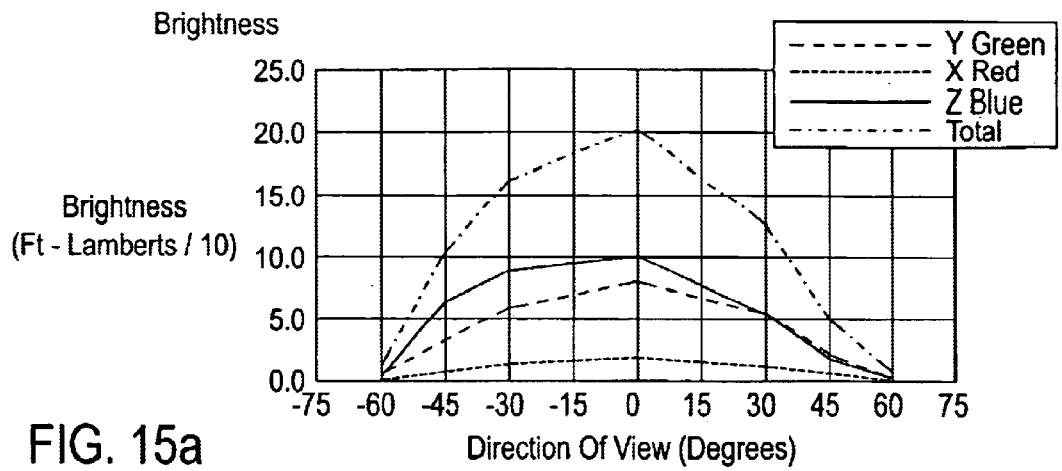
FIGS. 15 a, b, c are graphs of, respectively, color brightness and the normalized color brightness, and color shift achieved with the viewing screen of a standard projection television set.
Figure 15B:
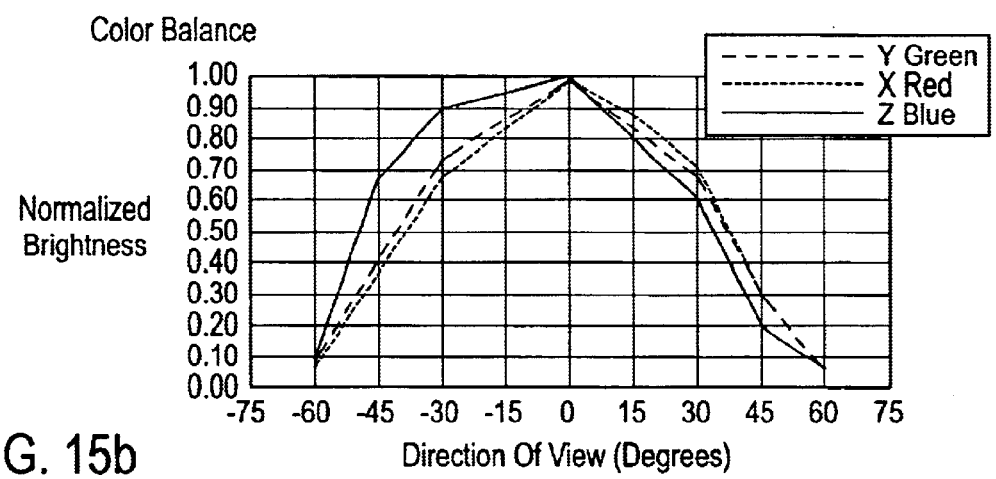
Figure 15C:
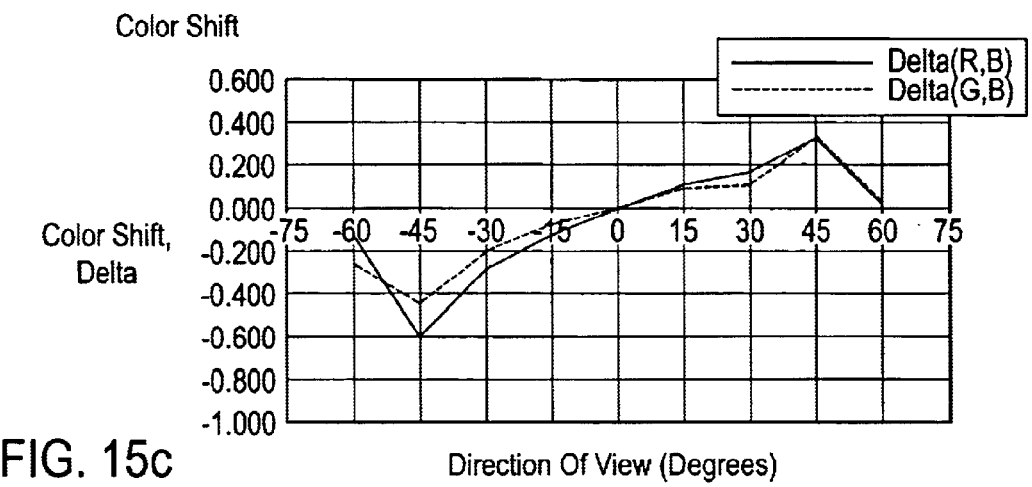

Image color and color shift can be quantified as measured by the spectrometer 49 in accordance with conventions used in the television industry. Referring now to the graphs of FIGS. 15a, b, c there are shown typical measurements of brightness, normalized brightness and color shift, respectively, among the three primary colors as a function of viewing angle relative to normal to the viewing screen, as measured on the viewing screen, as shown in FIG. 11, of a standard projection television set using a set up as illustrated in FIG. 10. The graph of FIG. 15a represents the brightness levels at each of the three primary colors and the total brightness over viewing angles of approximately (left to right) ±60° relative to normal (within a horizontal plane through the center of the screen). Non-proportional variations in brightness of the three primary colors at each viewing angle are perceived as color shifts (or changes in image hue) with viewing angle in a standard projection television set. The graph of FIG. 15b illustrates the balance of brightness among the three primary colors, normalized to the maximum respective brightness of each of the colors observed. Non-proportional variations in color brightness at different viewing angles are perceived as color shifts (or changes in image hue), as illustrated in the graph of FIG. 15c, as a function of viewing angle in a standard projection television set.

The results shown in Table 4 indicate that the color variation of the embodiment of the present invention (with a cylindrical lens array 53, as previously described) is smaller than for the standard projection screen and smaller than for the Uncorrected Embodiment without lens array 53.

In accordance with a convention in the television industry, image color shift may by quantified using the "delta" ($\delta$) parameters. These parameters are calculated from the tristimulus functions (X, Y, and Z; described above) measured at a single point on the screen as follows, $$\delta_{R, B}(\theta)=\ln\{[X(\theta)/X(0)]/[Z(\theta)/Z(0)]\} \quad \text{(Eq. 8)}$$

$$\delta_{R, B}(\theta)=\ln\{[Y(\theta)/Y(0)]/[Z(\theta)/Z(0)]\} \quad \text{(Eq. 9)}$$

Where, $X(\theta)$=blue luminance measured at angle $\theta$ $X(0)$=the blue luminance measured at normal incidence (i.e., 0°)

$Z(\theta)$=the red luminance measured at angle $\theta$ $Z(0)$=the red luminance measured at normal incidence (i.e., 0°)

$Y(\theta)$=the green luminance measured at angle $\theta$

Figure 16A:
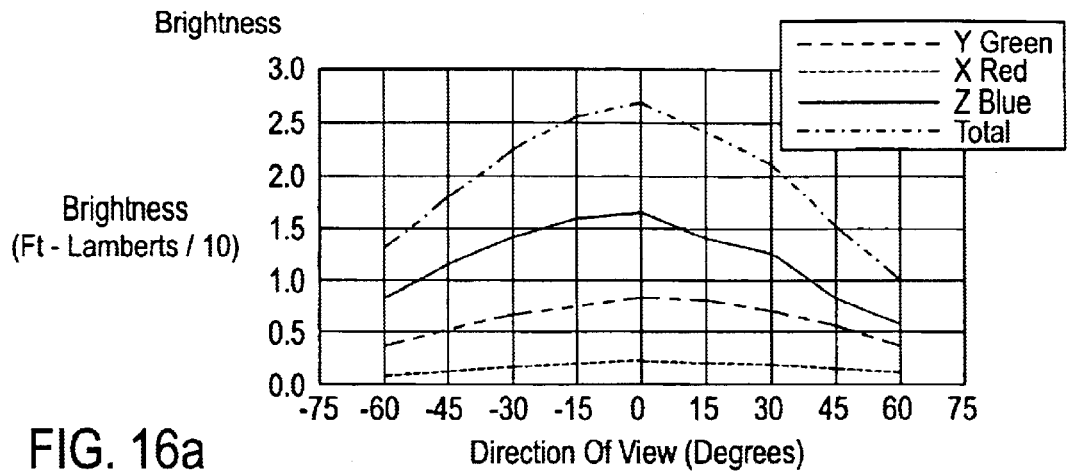
FIGS. 16 a, b, c are graphs of, respectively, color brightness and the normalized color brightness and color shift achieved with a viewing screen according to one embodiment of the present invention.
Figure 16B:
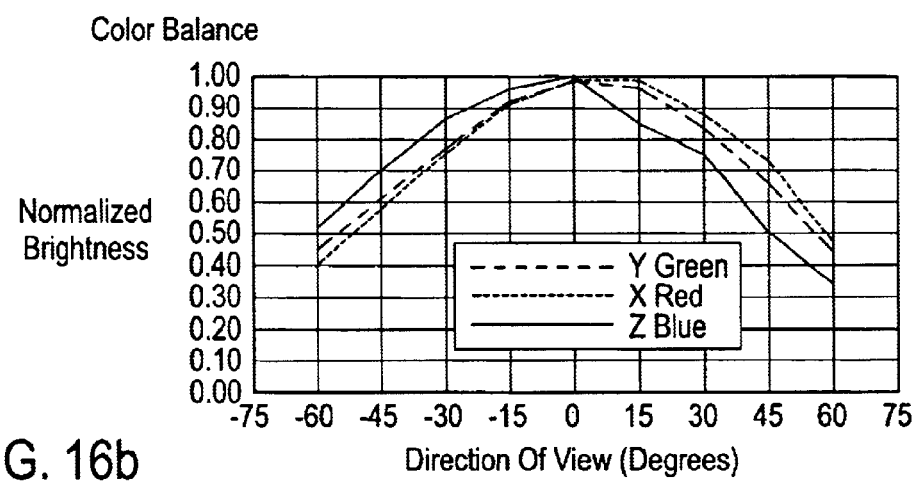
Figure 16C:
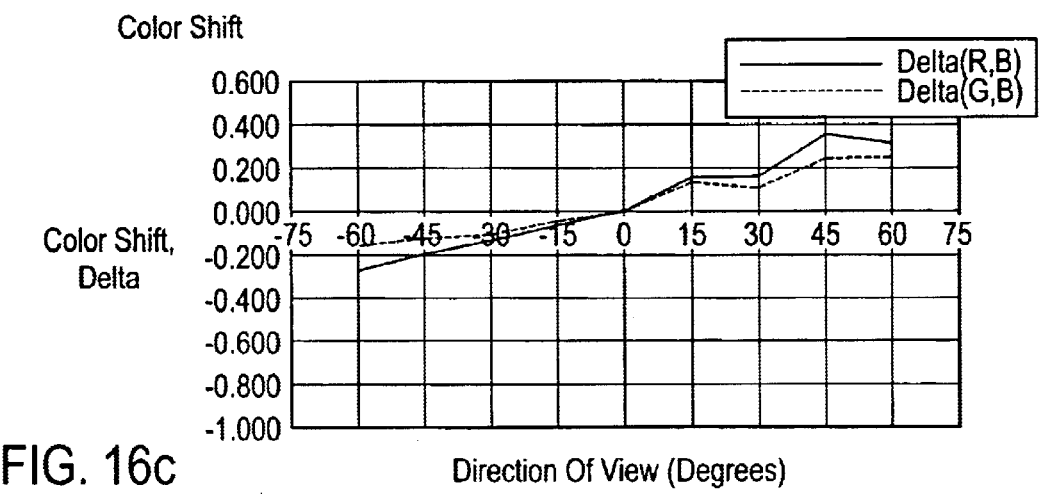
Figure 17C:
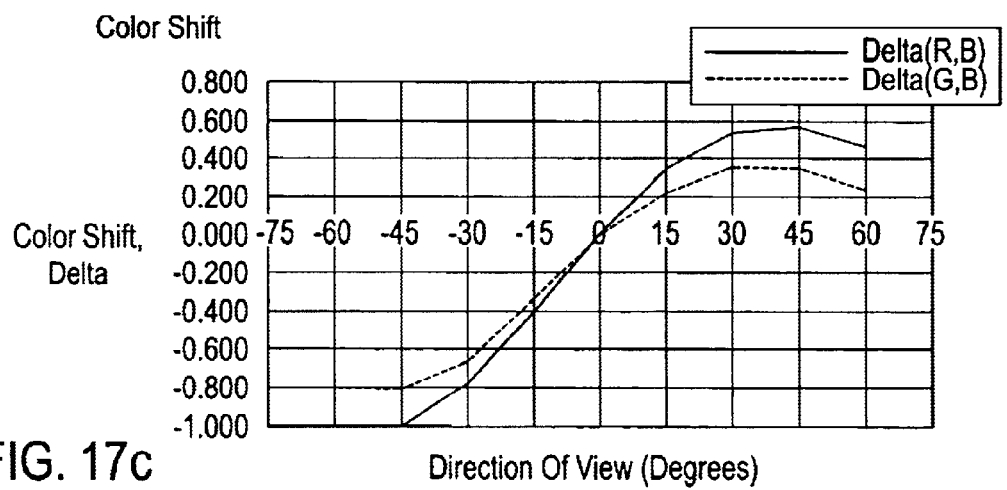

These color shifts are shown in FIG. 15c (standard projection screen), FIG. 16c (Embodiment of the Present Invention, including lens array 53), and FIG. 17c (Uncorrected Embodiment without lens array 53).

The television industry has specified perceived color shift as being acceptable, if $$\delta < 0.5 \text{ for all viewing angles and} \quad \text{(Eq. 10)}$$

$$\text{the change in } \delta < 0.1 \text{ over any 5° of viewing angle.} \quad \text{(Eq. 11)}$$

It can be seen by comparing the magnitudes in the graphs of FIG. 15c, 16c, and 17c that the Embodiment of the Present Invention illustrated in FIG. 13 has lower overall $\delta_{R, B}(\theta)$ and $\delta_{R, B}(\theta)$ than either the Uncorrected Embodiment without lens array 53 or the standard projection screen.

Referring now to the graphs of FIGS. 16a, 16b, and 16c there are shown typical measurements of brightness, normalized brightness and color shift, respectively, among the three primary colors as a function of viewing angle relative to normal to the viewing screen according to one embodiment of the present invention. Specifically, the embodiment of a viewing screen in accordance with the present invention from which the graphical data was derived includes an image-enhancing filter 57 as illustrated and described, for example, with reference to FIG. 9A of U.S. Pat. No. 6,076,933. In addition, this embodiment of the present invention, as illustrated in FIG. 13, also includes an array 53 of vertically-oriented, single-convex cylindrical lens disposed at a spatial pitch of about 60 lenses/inch.

It should be noted from the graph of FIGS. 16a, b, c that brightness variations are more proportional at each viewing angle over the range of viewing angles for resultant diminished color shifts as a function of viewing angle. Also, it should be noted from the graph of FIG. 16b that variations in normalized brightness at each viewing angle are more uniform for less significant color shifts in the described embodiment of the present invention. In the embodiment, illustrated in FIG. 13, a layer 53 of approximately 60 cylindrical lenses per inch are vertically aligned in contiguous array in front of the Fresnel lens 57. Of course, the vertically-aligned lenses may have higher or lower spatial pitch than 60 lens/inch and may be formed on a substrate layer of selected thickness to achieve other brightness or color balance characteristics as a function of viewing angle. The cross-sectional curvature of each lens in the array 53 may be circular, elliptical, parabolic, or other shapes including prisms such as elongated trapezoids or triangles.

Image color and color shift can be quantified as measured by the spectrometer 49 in accordance with color conventions used in the optical industry. Specifically, image color can be quantified by using color coordinate standards established in 1976 by an industry standards group known as the Commission International d'Eclaritage (in English—The International Commission on Illumination). This convention is referred to by the date and abbreviation of the French title as the 1976 CIE Standard. Specifically, the color coordinates u' and v'0 are calculated from the tristimulus functions of the human eye established by the CIE for brightness of green (Y), red (X), and blue (Z). Thus;

$$u'=4X/(X+15Y+3Z) \quad \text{(Eq. 12)}$$

and $$v'=9Y/(Xx+15Y=3Z) \quad \text{(Eq. 13)}$$

With these coordinates the screen color can be calculated as a function of viewing angle from the spectrophotometer measurements, as set forth in Table 3 for a standard projection screen, an uncorrected screen without the lens array 53 of FIG. 13, and for one embodiment of the present invention including the lens array 53 as illustrated in FIG. 13.

TABLE 3

| | 60 deg. | 45 deg. | 30 deg. | 15 deg. | normal | 15 deg. | 30 deg. | 45 deg. | 60 deg. |
|---|---|---|---|---|---|---|---|---|---|
| Standard Projection Screen: | | | | | | | | | |
| $u'$ | 0.055 | 0.042 | 0.047 | 0.051 | 0.053 | 0.054 | 0.057 | 0.055 | 0.052 |
| Min | 0.042 | | | | | | | | |
| Max | 0.057 | | | | | | | | |
| Range | 0.016 | | | | | | | | |
| $v'$ | 0.454 | 0.433 | 0.461 | 0.471 | 0.479 | 0.488 | 0.489 | 0.507 | 0.483 |
| Min | 0.433 | | | | | | | | |
| Max | 0.507 | | | | | | | | |
| Range | 0.074 | | | | | | | | |
| Uncorrected Embodiment: | | | | | | | | | |
| $u'$ | 0.030 | 0.034 | 0.038 | 0.044 | 0.051 | 0.060 | 0.066 | 0.068 | 0.067 |
| Min | 0.030 | | | | | | | | |
| Max | 0.068 | | | | | | | | |
| Range | 0.038 | | | | | | | | |
| $v'$ | 0.368 | 0.365 | 0.384 | 0.423 | 0.426 | 0.482 | 0.491 | 0.492 | 0.483 |
| Min | 0.365 | | | | | | | | |
| Max | 0.492 | | | | | | | | |
| Range | 0.127 | | | | | | | | |
| Corrected Embodiment of the Present Invention: | | | | | | | | | |
| $u'$ | 0.040 | 0.043 | 0.045 | 0.046 | 0.047 | 0.050 | 0.051 | 0.056 | 0.053 |
| Min | 0.040 | | | | | | | | |
| Max | 0.056 | | | | | | | | |
| Range | 0.016 | | | | | | | | |
| $v'$ | 0.407 | 0.410 | 0.412 | 0.420 | 0.426 | 0.441 | 0.436 | 0.452 | 0.454 |
| Min | 0.407 | | | | | | | | |
| Max | 0.454 | | | | | | | | |
| Range | 0.047 | | | | | | | | |

Constancy of the color coordinates represents color balance or lack of color shift. For color coordinates that change only slightly, the color of the image is nearly constant over the viewing angles. Therefore, the amount that the color coordinates vary is proportional to color shift for, respectively, the standard projection screen, the uncorrected embodiment without lens array 53, and an embodiment of the present invention including lens array 53. The maximum variation of the color coordinates was calculated from the data in Table 3 taking the (maximum)–(minimum) values for each coordinate for each screen to yield the maximum color variation results listed in the following Table 4.

TABLE 4

| Range | Standard Screen | Uncorrected Embodiment | Embodiment of the Present Invention |
|---|---|---|---|
| $\Delta u'$ | .016 | .038 | .016 |
| $\Delta v'$ | .074 | .127 | .047 |

The lens arrays illustrated in FIG. 13 and in the embodiment of FIG. 14a provide substantial correction of the color variation viewed at various angles on the display screen or front surface 60 of the image filter 57. In this configuration, the lens array 53 acts to reduce the divergence of the (off-axis) blue light and red light relative to the (on-axis) green light. The curvature and substrate thickness of the lens array 53 can be of various selected shapes and dimensions to minimize this divergence. FIGS. 14a and 14b illustrate both orientations of the lens array 53 that can be used and each configuration works to reduce the divergence of off-axis light, and therefore to correct (or reduce) color shift. For a rear-projection application requiring a Fresnel lens, the configuration shown in FIG. 14a is preferred for orienting the smooth side of the lens array 53 in mating alignment with the smooth side of the Fresnel lens 55. In either orientation, the lens array 53 can correct some divergence of the red and blue off-axis beams. Any small amount of divergence that remains can be tolerated by the image filter 57 and Fresnel lens 55 combination. Such combination can be modified by orienting the lens array 53 and Fresnel lens 55 to receive the incident projected image either on the cylindrical lens surface, as illustrated in FIG. 13, or on the pitched segmented surface of the Fresnel lens 55.

Figure 18:
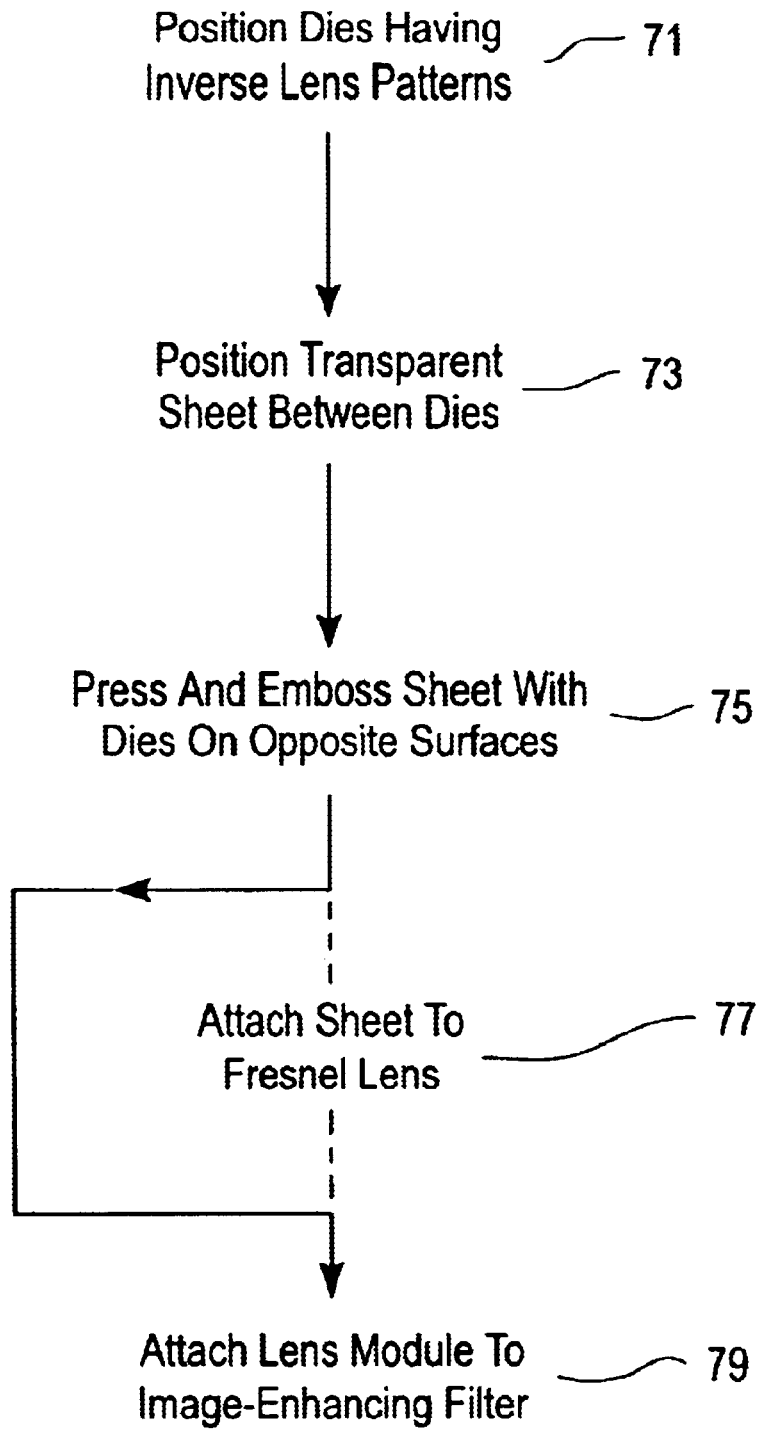
FIG. 18 is a flow chart illustrating one embodiment of a fabrication method according to the present invention.

In accordance with one embodiment of the present invention, as illustrated in the flow chart of FIG. 18, the lens array 53 and Fresnel lens 55 may be integrally formed on a common substrate layer of clear plastic material to facilitate convenient assembly of the two functionally distinctive optical components. Specifically, the inverse shapes of each of the lens arrays 53, 55 of selected shapes and configurations are formed 71 in master embossing dies, and a sheet of selected thickness of plastic material such as polymethyl methacrylate, or the like, is interposed 73 between the facing master embossing dies. The dies are heated and are pressed simultaneously into opposite surfaces of the sheet 75 to form therein the selected lens array 53 and Fresnel lens 55 for removal from the dies as an integral lens structure 53, 55. Such integral lens structure, or a composite structure of lens array 53 bonded 77 to Fresnel lens 55, is then affixed 79 to the image-enhancing filter 57 with some air space between the incident surface of the conformal layer 52 and the pitched, segmented surface of the Fresnel lens 55 (or between the conformal layer 52 and the lens array 53 in an inverted configuration of the assembly). The front or viewing surface 60 of the image-enhancing filter 57 may be coated or otherwise treated in conventional manner to reduce reflections of ambient light and external images from the viewing surface 60.

Therefore, the present invention establishes designs of Fresnel lenses suitable for substantially collimating projected light images over a wide range of dimensions of display screens for viewing the projected image. This results in substantial savings on costs of tooling required to produce only a few lens designs that can accommodate a wide range of screen sizes in conventional image display systems. Additionally, significant correction of color shift with viewing angle in rear-projection television screens can be achieved with an array of vertically-oriented lenses of cylindrical or other shapes interposed between the sources of the projected light images and the viewing screen to reduce the divergence of the three separately projected colors that form a color image.

I claim:

1. A light transmissive structure comprising:
   a substrate layer for transmitting light therethrough from an incident surface to an opposite exit surface;
   a layer of light transmissive beads disposed in a single layer on the incident surface of the substrate in substantially contiguous array;
   a Fresnel lens including a substrate body having a first surface and an opposite surface including a plurality of angularly-pitched surface segments disposed over an area substantially aligned with the area of the incident surface of the substrate layer; and
   an array of a plurality of elongated lenses disposed opposite the first surface of the Fresnel lens in contiguous array aligned along a single direction at a selected pitch for refracting light between the lens surface and pitched segments of the Fresnel lens.

2. The structure according to claim 1 in which the array of lenses is disposed to receive and refract incident light toward the pitched surface segments of the Fresnel lens.

3. The structure according to claim 1 in which each of the plurality of elongated lenses includes a substantially cylindrical surface.

4. The structure according to claim 1 in which each of the plurality of elongated lenses includes a prismatic configuration.

5. The structure according to claim 1 in which the cross sectional shape of each of the plurality of elongated lenses is monotonically cured.

6. The structure according to claim 1 in which the spacing pitch of the elongated lenses along the orthogonal direction is about 60 to 150 lenses per inch.

7. The structure according to claim 1 in which each of the angularly-pitched surface segments are dimensioned about 100–250 µm in width.

8. The structure according to claim 1 including a transparent layer disposed over the incident surface of the layer of beads.

9. The structure according to claim 8 in which the transparent layer is disposed in substantially conformal formation over each of the contiguous beads and has a thickness of about 0.5 to about 1.5 times radius of the contiguous beads.

10. The structure according to claim 1 including a transparent layer disposed over the incident surface of the layer of beads in substantially non-conformity with the surface of each of the contiguous beads.

11. The structure according to claim 8 in which the transparent layer has a selected index of refraction different from the index of refraction of the material forming the beads.

12. The structure according to claim 8 in which the indices of refraction of the beads is different from the index of refraction of the transparent layer.

13. The structure according to claim 8 in which the beads have different indices of refraction relative to the index of refraction of the transparent layer, and are randomly distributed in contiguous array in the layer.

14. The structure according to claim 8 in which the beads have dimension of about 50–100 µm.

15. The structure according to claim 1 including a substantially opaque material disposed about the beads within interstices therebetween to form a light transmissive aperture at an interface of each bead with the substrate layer.

16. The structure according to claim 1 in which the lens array and the Fresnel lens are disposed on opposite surfaces of a common substrate body.

17. The structure according to claim 1 in which the exit surface of the substrate layer exhibits anti-reflective optical characteristics.

18. The structure according to claim 8 in which the pitched, segmented surfaces of the Fresnel lens are spaced in air way from the transparent layer.

* * * * *

UNITED STATES PATENT AND TRADEMARK OFFICE
CERTIFICATE OF CORRECTION

PATENT NO.    : 6,807,020 B2
DATED         : October 19, 2004
INVENTOR(S)   : Charles Robert Wolfe It is certified that error appears in the above-identified patent and that said Letters Patent is hereby corrected as shown below:

Title page,
Item [57], ABSTRACT,
Line 3, please replace "system" with -- systems --

Column 14,
Line 3, please replace "cured" with -- curved --
Line 49, please replace "way" with -- away --

Signed and Sealed this

Fifteenth Day of February, 2005

JON W. DUDAS
*Director of the United States Patent and Trademark Office*